Oct. 18, 1960     O. C. SINGER ET AL     2,956,750
ROTARY DISTRIBUTOR FOR SEWAGE TREATING APPARATUS
Filed July 13, 1959

INVENTORS.
OSCAR C. SINGER
GLEN H. REED
BY Malcolm W. Fraser
ATTORNEY

United States Patent Office 2,956,750
Patented Oct. 18, 1960

2,956,750
ROTARY DISTRIBUTOR FOR SEWAGE TREATING APPARATUS

Oscar C. Singer, 1027 Greenhills Drive, Toledo 7, Ohio, and Glen H. Reed, Toledo, Ohio; said Reed assignor to said Singer Filed July 13, 1959, Ser. No. 826,503

1 Claim. (Cl. 239—210)

This invention relates to rotary sewage distributors for use in distributing sewage into beds of trickling filters for secondary treatment of sewage.

An object is to improve the construction of such distributors and particularly the rotating mounting thereof by employing anti-friction bearings, which are effectively shielded from the liquid passing therethrough in a new and improved manner.

Another object is to simplify the structure and assembly of such distributors for increasing the efficiency, facilitating the assembly, and reducing the cost thereof.

Other objects and advantages of the invention will hereinafter appear and, for purposes of illustration but not of limitation, an embodiment of the invention is shown on the accompanying drawings in which—

Figure 1:
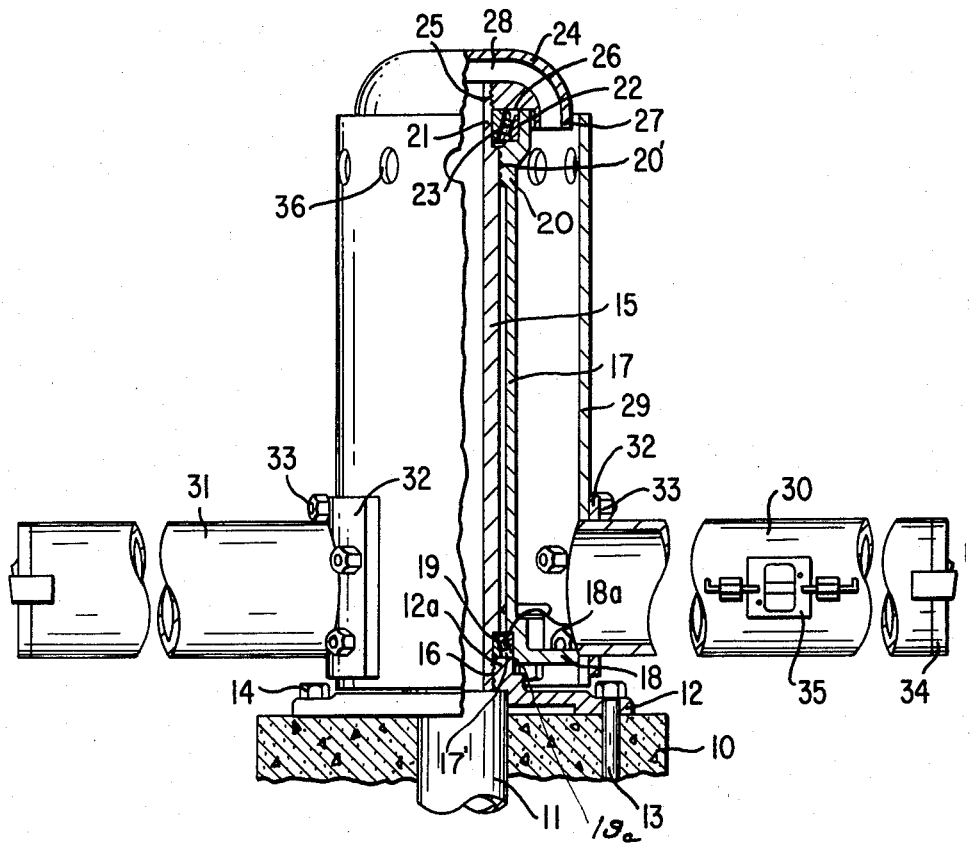
Figure 2:
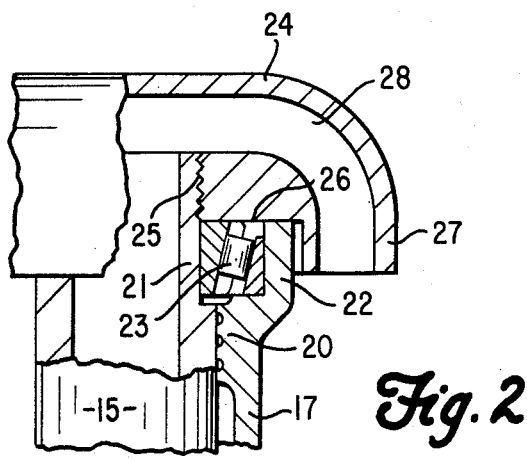

Figure 1 is a fragmentary elevation partly in vertical section of a rotary distributor; and Figure 2 is an enlarged fragmentary sectional view showing the roller bearing mounting for the upper end of the tubular spindle.

The illustrated embodiment of the invention comprises a concrete bed or platform 10 through which extends a vertical feed pipe 11 through which liquid sewage under pressure passes. Mounted upon the bed 10 is a distributor base 12 which is secured to the bed by a series of stud bolts 13 having nuts 14. The base 12 has an apertured central portion and formed with an upstanding central threaded boss 12a and supported by the base 12 is a standpipe 15, which has a reduced and shouldered lower end 16 which fits inside of the central boss 12a and is in screw threaded engagement therewith. Telescoping with and spaced from the standpipe 15 is a tubular spindle 17 which has at its lower end an integral laterally extending circular flange 18. The lower end portion of the spindle 17 is enlarged and has an annular recess 17' which cooperates with the shouldered end portion 16 of the standpipe 15 to receive a roller bearing assembly 19, a portion of which abuts the upper end of the boss 12a. Between the enlarged end of the spindle and the boss 12a is an annular groove 19a providing a grease seal.

The upper portion 20 of the spindle 17 is enlarged internally substantially to bear against and rotate upon the outer wall of the standpipe 15, this portion being formed with a series of grease grooves 20', which provide a seal for preventing the escape of lubricant from the anti-friction bearing disposed thereabove as will hereinafter appear. The upper end portion of the standpipe 15 is reduced and shouldered as indicated at 21 and the upper end of the tubular spindle 17 is enlarged to provide a bell-like portion 22. A roller bearing assembly 23 is disposed in the cavity formed by the bell portion 22 and the shouldered end portion 21 of the pipe 15. It will be observed that the grooves in the portion 20 are disposed directly beneath the roller bearing 23.

The upper end of the reduced end portion 21 is externally screw threaded to receive a dome-like cap 24 which engages screw threads 25 on the end portion 21 and is formed with a flat undersurface 26 to provide the top wall for the cavity receiving the roller bearing assembly 23. Manifestly the dome cap 24 may be adjusted relative to the bearing 23 for regulating the pressure thereagainst. Outside of the bell-like portion 22 and extending completely therearound is an overhang portion 27 which depends substantially below the upper end of the bell portion and beneath the surface 26. Formed in the cap 24 is a liquid passage 28 which extends from side to side and it will be apparent the the liquid passing through the over hang portion 27 will not in any way interfere with the proper action of the roller bearing 23, it being observed that the discharge end of the passage 28 is spaced substantially from the bearing so that the latter is properly shielded from the entrance of moisture.

Concentric with the tubular spindle 17 and spaced outwardly therefrom is an outer sleeve 29. The sleeve 29 fits over the circular flange 18 of the spindle 17 and is welded thereto. Radiating from the lower portion of the sleeve 29 is a pair of diametrically opposed tubes 30 and 31, the outer ends of which are closed by removable end closure caps 34. The tubes 30 and 31 extend through openings in the side of the outer sleeve 29 and are secured in place by flange plates 32 which are welded to the respective tubes. The flange plates 32 are secured to the sleeve 29 by bolt and nut assemblies 33. Formed in each of these tubes are nozzles 35, the nozzles in one tube being on one side and those of the other tube being on the opposite side thereby to enable the liquid discharged from the nozzles to impart revolving movement to the unit.

In the upper end portion of the outer sleeve 29 and at points below the bottom end of the over hang 27 is a series of overflow ports 36. In the event that the nozzles 35 or tubes 30 and 31 should become clogged, this liquid can back up and overflow through the ports 36 without entering the roller bearing 23 and adversely affecting the lubrication thereof.

In operation it will be understood that liquid sewage flows upwardly through the feed pipe 11 into the standpipe 15 and thence through the oppositely extending passages 28 into the outer sleeve 29 from whence the liquid flows laterally to the horizontal tubes 30 and 31 and thence over the filter bed through the nozzles 35 which impart revolving motion to the unit for distributing the sewage over the filter bed.

Numerous changes in details of construction, arrangement and operation may be effected without departing from the spirit of the invention especially as defined in the appended claim.

What we claim is:

A rotary dstributor for sewage treating apparatus comprising a base adapted to be anchored to a support, an upstanding boss on said base having a screw-threaded bore, a stand pipe threaded at its lower end in said bore, a reduced upper end on said stand pipe providing a shoulder, screw threads on the outer portion of said reduced end, a cap for the end of said stand pipe and in screw threaded engagement with the threaded outer end of said stand pipe, said cap having a laterally and downwardly extending overhang, liquid passage means in said cap for communication between the stand pipe and said overhang, a tubular spindle fitting over said stand pipe, cooperating annular recesses in the upper end of the stand pipe and spindle providing a bearing-receiving cavity, a flat surface on the cap above the overhang closing the upper end of said cavity, an anti-friction bearing assembly in said cavity, said bearing assembly being spaced from liquid discharged from said overhang, a second anti-friction bearing assembly between the lower end of the spindle and the stand pipe, a circular flange rigid with the lower end of said spindle, a sleeve concentric with said spindle and fixed at its lower end to said flange, overflow ports in said sleeve disposed below said upper anti-friction bearing assembly, and a pair of nozzle containing tubes closed at their outer ends and radiating from opposite sides of the lower end of said sleeve.

References Cited in the file of this patent

UNITED STATES PATENTS

| | | |
|---|---|---|
| 2,029,268 | Lund | Jan. 28, 1936 |
| 2,758,875 | Loveless | Aug. 14, 1956 |
| 2,865,562 | Burke | Dec. 23, 1958 |